United States Patent

De Vito et al.

Patent Number: 6,061,335
Date of Patent: May 9, 2000

[54] METHOD FOR DESIGNING SONET RING NETWORKS SUITABLE FOR LOCAL ACCESS

[75] Inventors: Nicholas Paul De Vito, Bedminster; Mohan Gawande, East Windsor; John G. Klincewicz, Wayside; Hanan Luss, Marlboro; Moshe B. Rosenwein, Long Branch; Romanath Roy, Bridgewater, all of N.J.

[73] Assignee: AT&T Corp, New York, N.Y.

[21] Appl. No.: 08/899,103

[22] Filed: Jul. 24, 1997

[51] Int. Cl.$^7$ ............................ H04L 12/28; G06F 11/00
[52] U.S. Cl. ........................ 370/258; 370/223; 370/238; 709/241
[58] Field of Search ..................................... 370/216, 217, 370/223, 224, 222, 238, 254, 255, 258, 453, 457; 709/241

[56] References Cited

U.S. PATENT DOCUMENTS

| 5,515,367 | 5/1996 | Cox, Jr. et al. |
| 5,546,542 | 8/1996 | Cosares et al. ........................ 709/241 |
| 5,729,692 | 3/1998 | Qiu et al. ................................ 709/241 |
| 5,923,646 | 7/1999 | Mandhyan ............................... 370/254 |

OTHER PUBLICATIONS

Shi and Fonseka, "Design of Hierarchical Self-Healing Ring Networks", IEEE International Conference on Humanity Through Communications, pp. 478–482 vol. 1, May 1–5, 1994.

Altinkemer, K.; Topological Design of Ring Networks, Computers and Operations Research, vol. 21 No. 4 (1994), pp. 421–431.

Cosares, S., Deutsch, D. N., Saniee, I., Wasem, O. J.; SONET Toolkit: A Decision Support System for Designing Robust and Cost–Effective Fiber Optic Networks, Interfaces 25, 1 Jan.–Feb. 1995 (pp. 20–40).

Laguna, M.; Clustering for the Design of SONET Rings in Interoffice Telecommications, Management Science, vol. 40, No. 11, Nov. 1994, pp. 1533–1541.

Prim, R. C.; Shortest Connection Networks and Some Generalizations, Bell System Technical Journal, 36 (1957) pp. 1389–1401.

Shi, J., Fonseka, J. P.; Hierarchical Self–Healing Rings, IEEE/ACM Transactions on Networking, 3 (1995) pp. 690–697.

Tietz, M. B., Bart, P.; Heuristic Methods for Estimating the Generalized Vertex Median of a Weighted Graph, Operations Research 16 (1968) pp. 955–961.

Wasem, O. J.; An Algorithm for Designing Rings for Survivable Fiber Networks, IEEE Transactions on Reliability, 40 (1991) pp. 428–432.

(List continued on next page.)

Primary Examiner—Hassan Kizou
Assistant Examiner—John Pezzlo

[57] ABSTRACT

A method is provided for designing a hierarchical architecture for a synchronous optical network (SONET) given a plurality of demand nodes at which communications traffic originates and at least one destination node at which the communications traffic is collected for transmission to a switch. The method includes the steps of: (a) dividing the plurality of demand nodes into distinct groups of demand nodes; (b) selecting at least one node for each group to serve as a ring hub for connection to a backbone ring; (c) designing a backbone ring topology that includes at least the ring hubs and the destination node; (d) designing an access ring topology for each of the demand node groups so that the backbone ring and access ring topologies constitute a preliminary network topology; (e) evaluating a cost associated with the preliminary network topology; (f) selecting at least one alternative ring hub to provide a new set of ring hubs; (g) repeating steps (c)–(e) for the new set of ring hubs to determine if a resulting network cost estimate is reduced; (h) repeating steps (f)–(g) until a minimum cost network topology is produced. Other aspects of the invention are directed to hub and spoke topology design and SONET transport design.

11 Claims, 3 Drawing Sheets

OTHER PUBLICATIONS

Wasem, O. J.; Survivable SONET Networks—Design Methodology, IEEE Journal on Selected Areas in Communications, 12 (1994) pp. 205–212.

Wu, T–H., Cardwell, R. H., Boyden, M.; A Multi–Period Design Model for Survivable Network Architecture Selection for SONET Interoffice Networks, IEEE Transactions on Reliability, 40 (1991) pp. 417–427.

Wu, T–H.; Fiber Network Service Survivability, Artech House, Boston, (1992), Sec. 8.2.2, pp. 345–354.

Johnson, D. S., Demers, A., Ullman, J. D., Garey, M. R., Graham, R. L.; Worst–Case Performace Bounds for Simple One–Dimensional Packing Algorithms, SIAM Journal of Computing, 3 (1974) pp. 299–325.

METHOD FOR DESIGNING SONET RING NETWORKS SUITABLE FOR LOCAL ACCESS

BACKGROUND

Local access markets in the telecommunications business are becoming increasingly competitive with the advent of deregulation. Local access service requires the provision of subscriber connectivity to the traditional Plain Old Telephone Service (POTS), a variety of data services, as well as new telecommunications services such as Cable TV, wireless, Personal Communications Service (PCS), and high bandwidth digital connectivity to access the Internet. Two of the most desirable attributes of a network designed to provide these services are reliability and the ability to grow economically to keep pace with the market.

In general, a telecommunications t=ansport network consists of a set of demand nodes from which demand originates, a set of destination nodes at which demand terminates and a set of links and intermediate nodes that join the two sets of nodes. In the particular context of a local access network, the demand nodes consist of large business premises and Local Serving Offices (LSOs). An LSO represents a collection point of demand traffic from many residential and small business customers. The destination nodes in the local network are the network nodes at which terminating cross connect equipment and local and long-distance switches are placed. A particular network node to which most of the demand is destined is designated as the Service Node.

The transport technology known as Synchronous Optical Network (SONET) possesses the attributes required by local access networks. That is, SONET provides an economical, flexible and highly reliable transport mechanism for modem telecommunications networks. In particular, SONET facilitates the design of Self-Healing Ring (SHR) netvorks, which offer rapid service restoration after a network failure, e.g., after a fiber cut. The telecommunications industry is rapidly deploying SONET ring networks in many of its networks, including local networks. One particular SONET architecture that would be appropriate for local access networks is known as Path-in-Line (PIL). A PIL architecture employs a plurality of interlocked rings arranged in a hierarchical fashion.

The design methodology for a SONET architecture may be divided into the design of the network topology and the design of the SONET rings themselves. The network topology refers to the spatial arrangement of the links in the network. For example, in a ring topology, several links are connected in a cycle to form a topological ring. The SONET rings refer to the physical communication paths that traverse the network ring topology. More specifically, a SONET ring consists of a single fiber pair that traverses each link of the topological ring. Because of limits on capacity and the number of nodes that may be supported, several SONET rings may be required to serve all the nodes on a single topological ring, Such SONET rings that traverse the same topological ring are said to be stacked.

A primary objective of a network design method is to construct the least cost network that meets certain topological constraints. The cost of a SONET network is comprised of the transport cost involved in creating links of optical fiber plus the cost of the SONET equipment at the nodes. The transport cost consists of two major components: mileage cost and fiber cost. The mileage cost depends on the actual length of network links and represents the cost of establishing these links, including the right-of-way (ROW) costs and Engineering & Implementation (E&I) costs. The fiber cost depends on both the mileage and the number of fiber strands required, which in turn depends on the demand. The equipment cost is largely a function of the SONET architecture and the demand. Given this network design objective, the problem addressed by network design may be reformulated with more particularity as follows: Given a set of demand, destination and intermediate nodes, a SONET architecture, a cost structure, and a set of topological constraints, the design method determines which links should he constructed and how much equipment should be deployed to provide the most economical connectivity among the nodes. The constraints generally dictate limits on the membership and size of the topological structures. The constraints imposed on a PIL SONET architecture appropriate for local access include a dual hubbed hierarchical ring topology with all the destination nodes residing on the backbone ring so that traffic is directed from a large number of demand nodes to a relatively few destination nodes.

Most of the demand nodes lie on topological rings. Some demand nodes, however, may be connected to a node on the ring network, known as a "root" node, via a hub and spoke topology. A hub and spoke topology resembles a tree, consisting of links, known as spokes, that interconnect a set of demand nodes without forming a cycle. The stacked SONET rings associated with the toplogical ring on which a hub & spoke network is "rooted" also serve the demand nodes on the hub & spoke network.

Known methodologies for designing SONET networks have focused on the use of bi-directional line switched SONET rings for core networks. Such networks, which are well suited for situations where significant point-to point demand exists, include the long distance core network and the network serving the local exchange carriers' switch-to-switch traffic. BellCore's SONET Toolkit for example, offers such design algorithms. (See Cosares, S. et al., "SONET Toolkit: A Decision Support System for Design of Robust and Cost-Effective Fiber-Optic Networks", *Interfaces*, 25 (1995) pp. 20–40, as well as Wasem, O. J., "An Algorithm for Designing Rings for Survivable Fiber Networks", *IEEE Transactions on Reliability*, 40 (1991) pp. 428–432, Wasem, O. J, et al. "Survivable SONET Networks—Design Methodology", *IEEE Journal on Selected Areas in Communications*, 12 (1994) pp. 205–212 and Wu, T. et al., "A Multi-period Design Model for Survivable Network Architecture Selection for SONET Interoffice Networks" *IEEE Transactions on Reliability*, 40 (1991) pp. 417–427). Another method and system for ring design in such networks was developed by US West; see Cox, L. A. et al., "Method and System for Planning and Installing Communications Networks", U.S. Pat. No. 5,515, 367, May 7, 1996. Laguna, M., "Clustering for the Design of SONET Rings in Interoffice Telecommunications", *Management Science*, 40 (1994) pp. 1533–1541 considers clustering in a non-hierarchical ring network with significant point-to point demand. Altinkemer, K., "Topological Design of Ring Networks" *Computers and Operations Research*, 21 (1994) pp. 421–431 discloses a method for designing access rings when the backbone ring has already been determined and only a single hub per access ring is required. Similarly, Shi, J. and Fonseka, J. P., "Hierarchical Self-Healing Rings", *IEEE/ACM Transactions on Networking*, 3 (1995) pp. 690–697 address the problem of designing a hierarchical network with a single hub per access ring and a uniform number of nodes per ring.

The known methodologies do not address the problem of designing a SONET architecture appropriate for local access on which are imposed the previously enumerated topological constraints. In particular, the known methodologies do not address the situation where: the demand is directed from many demand nodes to a few destination nodes; the network topology consists of hub & spoke trees, dual-hubbed access rings and backbone rings, connected in a hierarchical manner; the transport costs dominate the equipment costs; and the network may consist of several hundred demand nodes.

SUMMARY OF THE INVENTION

A method is provided for designing a hierarchical architecture for a synchronous optical network (SONET) given a plurality of demand nodes at which communications traffic originates and at least one destination node at which the communications traffic is collected for transmission to a switch. The method includes the steps of: (a) dividing the plurality of demand nodes into distinct groups of demand nodes; (b) selecting at least one node for each group to serve as a ring hub for connection to a backbone ring; (c) designing a backbone ring topology that includes at least the ring hubs and the destination node; (d) designing an access ring topology for each of the demand node groups so that the backbone ring and access ring topologies constitute a preliminary network topology; (e) evaluating a cost associated with the preliminary network topology; (f) selecting at least one alternative ring hub to provide a new set of ring hubs; (g) repeating steps (c)–(e) for the new set of ring hubs to determine if a resulting network cost estimate is reduced; (h) repeating steps (f)–(g) until a minimum cost network topology is produced. Other aspects of the invention are directed to hub and spoke topology design and SONET transport design.

The inventive design method is particularly advantageous in a so-called "green field" context in which only small portions of the currently existing network infrastructure will be used and most of the network will be constructed from new links. Moreover, the inventive method is capable of efficiently designing networks having several hundred demand nodes.

DETAILED DESCRIPTION

The present invention is directed to a method for designing a SONET architecture suitable for use in a local access network. While for purposes of illustration the invention will be described in terms of the design of a PIL SONET architecture, one of ordinary skill in the art will recognize that the invention has applicability to the design of other architectures as well, such as the ones described in Section 8.2.2 of T-H. Wu, "Fiber Network Service Survivability", Artech House, Boston, (1992).

Figure 1:
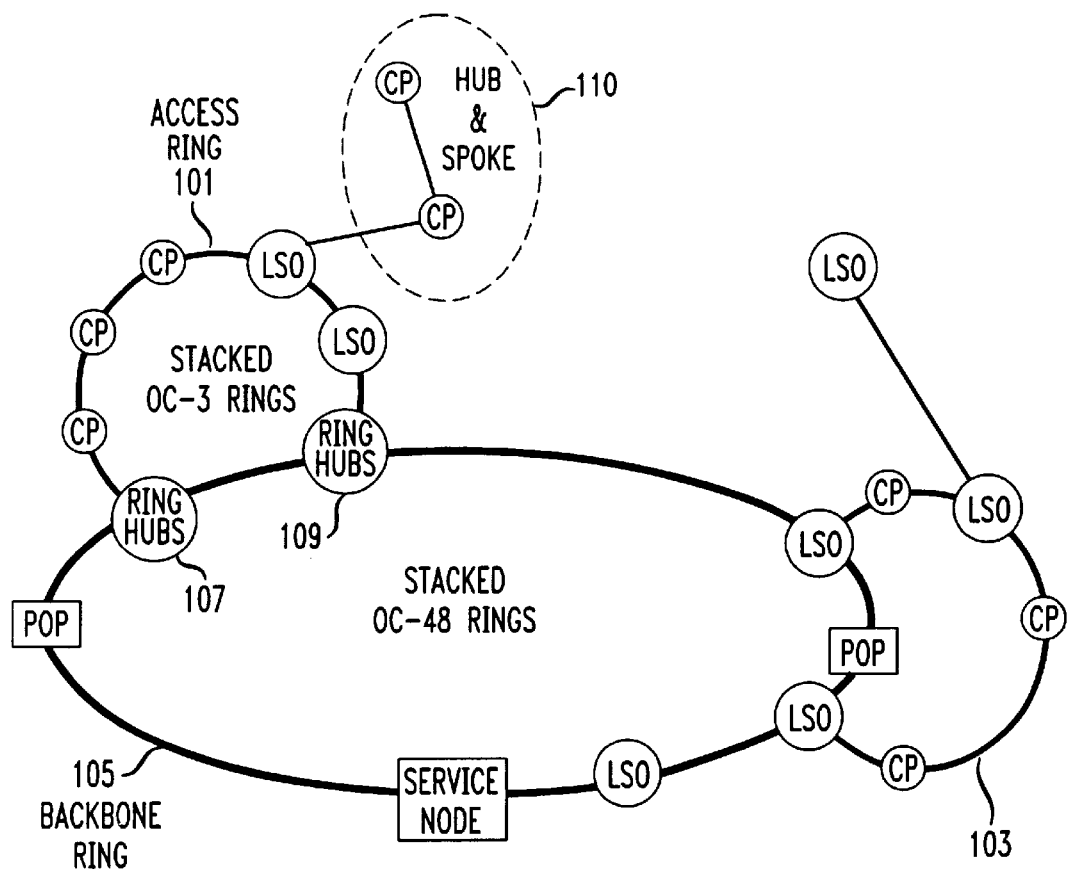
FIG. 1 shows a simplified diagram of an exemplary path-in-line SONET network.

As shown in FIG. 1, a PIL architecture for a local access network includes two sets of topological rings: access rings such as rings 101 and 103 and a backbone ring 105 as well as hub and spoke trees 110. A topological access ring or a hub and spoke tree carries lower speed SONET rings such as an OC-3 ring, whereas a topological backbone ring carries higher speed SONET rings such as an OC-48 ring. Access rings are used primarily to collect demand from demand nodes. The backbone rings contain network destination nodes and intermediate nodes as well as some large demand nodes. A ring network of the type shown in FIG. 1 is often referred to as a hierarchical ring network.

In a PIL architecture, each access ring is connected to a back bone ring at two intermediate nodes known as ring hubs. For example, in FIG. 1, access ring 101 is connected to backbone ring 105 by ring hubs 107 and 109. To avoid a loss of connectivity between a given access ring and the backbone ring, the frequency of simultaneous hub failures is reduced by requiring a minimum separation between the two ring hubs of the given access ring. A ring hub may serve more than one access ring. The cost of each ring hub includes a fixed cost associated with configuring a node as a ring hub as well as a variable cost that depends on the total demand supported on the access rings using the hub. It should be noted that SONET architectures other than a PIL architecture may only require a single ring hub to connect an access ring to a backbone ring.

As previously noted, the constraints imposed on a PIL SONET architecture appropriate for local access include a dual hubbed hierarchical ring topology with all the destination nodes residing on the backbone ring so that traffic is directed from a large number of demand nodes to a relatively few destination nodes. In some circumstances additional constraints may be imposed on a SONET PIL architecture due to technological and Quality Of Service (QOS) considerations. These additional constraints include:

Specification of a maximum length for individual access and backbone rings because of QOS considerations on SONET paths carrying voice circuits.

The use of select preexisting fiber segments for routing links. No two links of a topological ring may be routed on the same fiber segment. The per unit cost of these segments is significantly lower compared to the cost of establishing a new link.

Specification of a maximum number of nodes allowed on each access ring to limit loss of service due to multiple node failures.

Specification of a minimum number of nodes to avoid creation of very small access rings.

Specification that certain demand nodes are to be connected to ring nodes using a hub-and-spoke topology.

In accordance with the present invention, a PIL SONET network is designed by decomposing the problem into three sub-steps which are then sole ed in a sequential fashion. The sub-steps are the design of the ring topology, the hub-and-spoke topology and the SONET transport system. The following sections describe the design of each of these sub-problems.

Ring Topology Design

Figure 2:
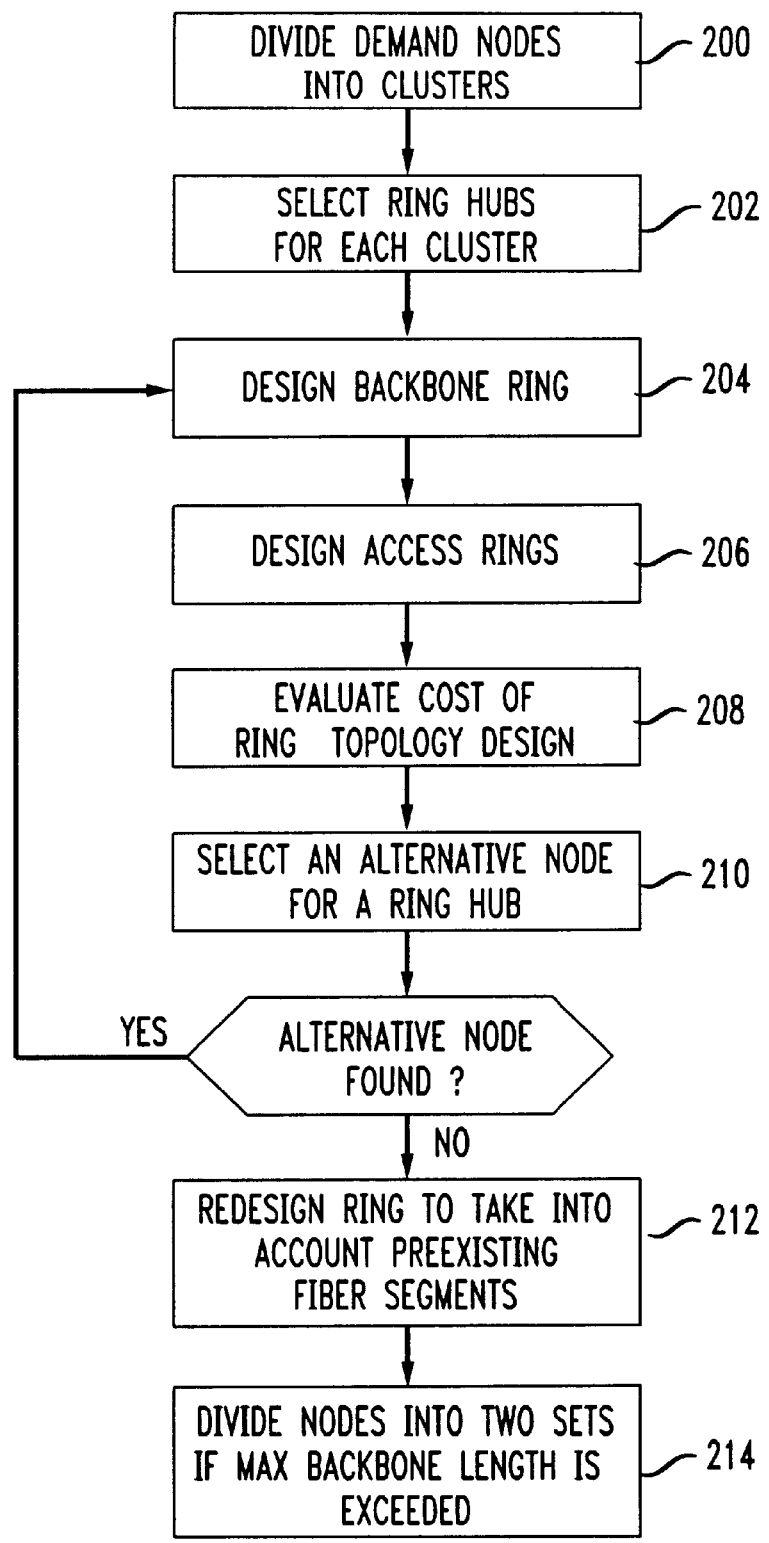
FIG. 2 is a flowchart showing the method of designing the ring topologies in accordance with the present invention.

The design of the ring topology proceeds in accordance with the flowchart shown in FIG. 2. First, the demand nodes are divided into distinct clusters (step 200). Each cluster represents an access ring. A clustering algorithm that may be employed is based on the p-median heuristic disclosed in M. B. Tietz and P. Bart, "Heuristic Methods for Estimating the Generalized Vertex Median of a Weighted Graph," Operations Research 16, (1968) p. 955–961. This algorithm can be adapted to enforce constraints on the maximum number of nodes that are allowed per access ring. After a set of clusters is generated, individual nodes may be switched among clusters to enforce constraints on the minimum number of nodes per access ring. Within each cluster a pair of ring hubs are designated (step 202). The ring hubs may be chosen based on the proximity of the nodes to the geographic median of the cluster.

Given the set of ring hubs designated in the previous step a backbone ring topology is designed in accordance with known techniques, such as a Traveling Salesman Problem (TSP) heuristic, (step 204). The backbone ring includes the rings hubs as well as other nodes that may be designated as residing on the backbone. Next, an access ring topology is designed for each cluster using a TSP heuristic (step 206), based on the nodes that have been assigned to each cluster (including the respective ring hubs) in step 200. If a PIL architecture is being designed so that pairs of ring hubs are required to be adjacent, ring hub pairs are treated as a single "super node." In the event that one or more of the access rings violates a maximum length constraint, select nodes are shifted to other clusters and the rings are resequenced. Once a ring topology has been designed in accordance with the previously enumerated steps, its cost is evaluated and, if found to be an improvement over previous designs, the result is stored (step 208).

The process continues by replacing a ring hub with an alternative node to reduce the length of the backbone (step 210). If such a node is found, the process returns first to step 204 to design a backbone ring based on the new set of ring hubs and then to step 206 to design corresponding access rings. Once a solution has been determined by repeating steps 200–210 multiple times, the topological rings are redesigned in accordance with a Steiner TSP heuristic by taking into account preexisting fiber segments (step 212). The Steiner TSP heuristic requires that the previously selected demand nodes, ring hubs and network nodes remain in the final design while other nodes (i.e., nodes connected to preexisting fiber segments) can be incorporated if they are beneficial.

Finally, if the length of the resulting backbone exceeds a predefined maximum, the access rings and any backbone demand nodes are clustered into two or more different sets and separate topological backbone rings are designed for each set in accordance with steps 204 and 212.

Hub and Spoke Design

Figure 3:
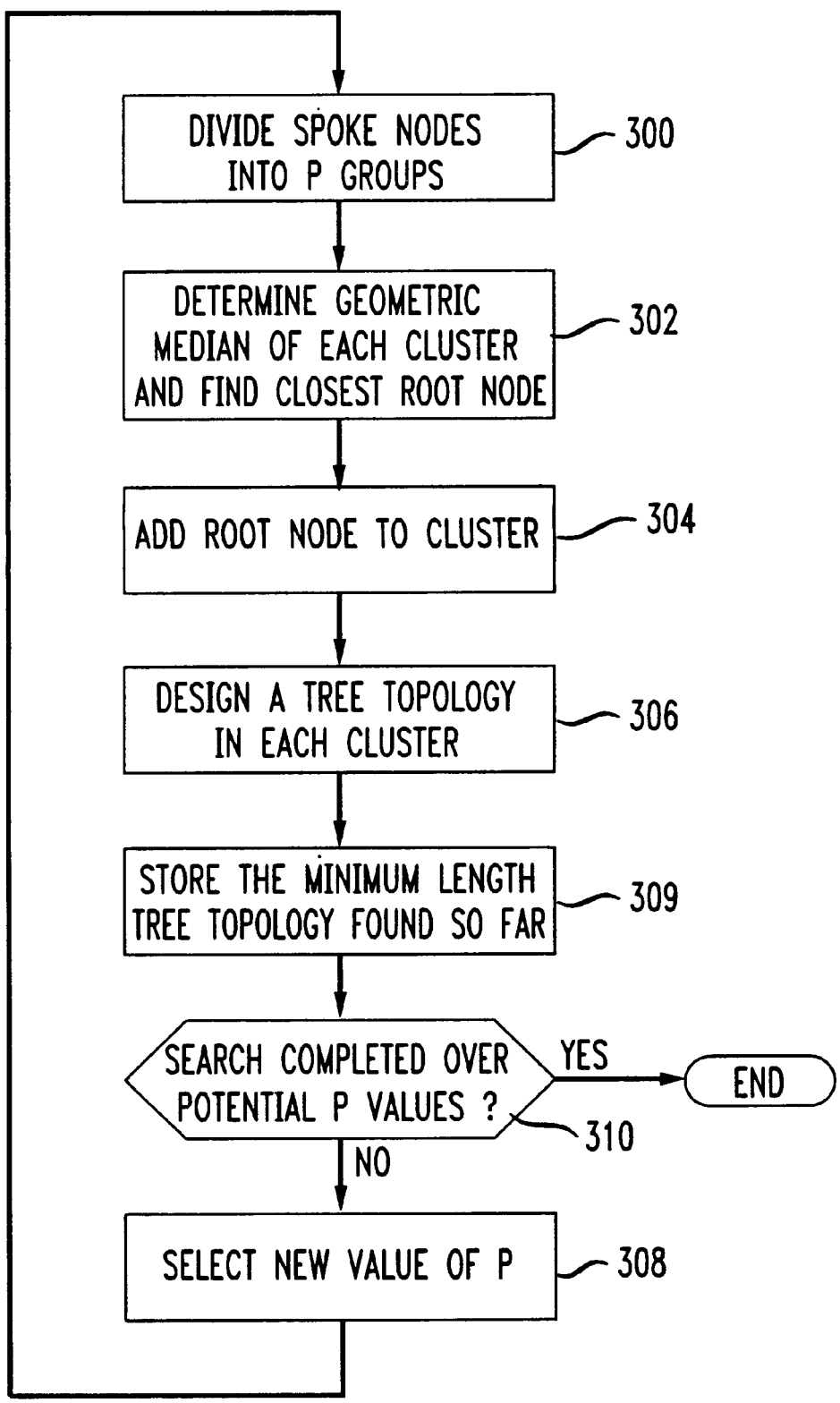
FIG. 3 is a flowchart showing the method of designing the hub-and-spoke topology in accordance with the present invention.

The hub-and-spoke topology is designed subsequent to the design of the ring topology. Demand nodes that have been preselected to reside on a hub-and-spoke tree are referred to as spoke nodes. The root of each tree may be a node selected from among the nodes on either an access ring or a backbone ring. Clearly, if the number of spoke nodes and the number of potential root nodes is large, the number of tree networks that could possibly be designed is enormous. To determine an optimal design from among these many designs, the following procedure, which is shown in FIG. 3, may be employed.

First, the preselected spoke nodes are divided into p groups (step 300). A variety of clustering criteria may be employed, including a p-median clustering technique based on the heuristic disclosed in M. B. Teitz et al., mentioned above. Each cluster contains a position representing the geometric median of the cluster. Next, a backbone or access ring node is located which is closest in proximity to the geometric median to serve as the root node (step 302). The selected root nodes, which must be chosen from among only those nodes that have been predefined as potential roots, are added to their respective clusters (step 304). If the same ring node serves as the closest root node to two or more clusters, the clusters are combined. The topology of each cluster is designed in accordance with a standard Minimum Spanning Tree (MST) algorithm such as disclosed in Prim, R. C., "Shortest Connection Networks and Some Generalizations", *Bell System Technical Journal*, 36 (1957) pp. 1389–1401 (step 306). Once a tree topology is established, the spoke nodes are again divided into p groups, where p is now varied from its initial value. The final design is the design corresponding to the value of p that yields the minimum total tree length (step 310). The number of different trees that should be evaluated (i.e., the number of different groups p into which the clusters should be divided) will depend on the total number of spoke nodes s. For small values of s (e.g., less than 50), all values of p between 1 and s are evaluated. For larger values of s, values of p between s/25 and s are evaluated in increments of 10. A better value for p may be obtained by conducting a finer search for values of p in the neighborhood of its best determined value. Once a hub-and-spoke topology has been selected, an attempt is made to further reduce its total length by moving end nodes from each tree to a neighboring tree.

SONET Transport Design

The SONET transport design constructs stacked SONET rings in each topological access and backbone ring. For the purpose of SONET transport design, the demand nodes on a hub and spoke topology are considered to be part of the topological ring on which the hub and spoke tree is rooted. The particular design approach that is employed depends upon the particular SONET architecture being constructed. For example, a hierarchical ring architecture such as the PIL architecture uses lower speed unidirectional path switched OC-3 rings to serve the demand nodes on the access rings and the hub-and-spoke trees. The OC-3 rings then ride on higher speed OC-48 rings serving on the backbone. The backbone OC-48 rings are also operated in the unidirectional path switched mode. Each OC-3 ring is limited in terms of the total demand it can carry and the number of nodes it serves. In one embodiment of the invention, a bin-packing heuristic algorithm is used to assign demand nodes to different OC-3 rings on each access ring. The bin-packing heuristic may be obtained by modifyng the first-fit decreasing heuristic disclosed in Johnson et al., "Worst-case Performance Bounds for Simple One-dimensional packing Algorithms", *SIAM Journal of Computing*, 3 (1974) pp. 299–325. As modified, the bin-packing heuristic employs the same number of rings as determined by the first-fit decreasing heuristic, but it attempts to assign demand to the rings in such a way that the demand is more evenly distributed among the rings. This heuristic provides approximately the minimum number of SONET rings that are required, thus minimizing ring hub equipment cost. The OC-48 rings residing on the backbone topology also may be designed in accordance with a bin-packing algorithm. The input traffic used in designing the OC-48 rings is the demand from the OC-3 access rings and from any demand nodes placed directly on the backbone. By minimizing the number of OC-48 rings that are required, the amount of equipment needed at the service node is also reduced.

What is claimed is:

1. A method for designing a hierarchical architecture for a synchronous optical network (SONET) given a plurality of demand nodes at which communications traffic originates and at least one destination node at which said communications traffic is collected for transmission to a switch, said method comprising the steps of:

a. dividing the plurality of demand nodes into distinct groups of demand nodes;

b. selecting at least one node for each group to serve as a ring hub for connection to a backbone ring;

c. designing a backbone ring topology that includes at least said ring hubs and said at least one destination node;

d. designing an access ring topology for each of said demand node groups so that said backbone ring and said access ring topologies constitute a preliminary network topology;

e. evaluating a cost associated with said preliminary network topology;

f. selecting at least one alternative ring hub to provide a new set of ring hubs;

g. repeating steps (c)–(e) for the new set of ring hubs to determine if a resulting network cost estimate is reduced; and h. repeating steps (f)–(g) until a minimum cost network topology is produced.

2. The method of claim 1 wherein select demand nodes are preselected to serve as spoke nodes residing on a hub and spoke tree topology, and further comprising the steps of:

i. dividing the select demand nodes into a first plurality of groups;

j. determining a location representing a geographic median of each of said first plurality of groups and, for each group, associating therewith a root node from among said nodes residing on either of said backbone or access ring topologies, each of said root nodes being closest in proximity to said geographic median location of its respective group;

k. designing a tree topology for each of said first plurality of groups such that each root node connects the ring on which it resides to the tree representing the group of nodes associated therewith;

l. dividing the select demand nodes into a second plurality of groups different from said first plurality of group,s and repeating steps (j)–(k) for said second plurality of groups; and m. repeating step i until a tree topology having a minimum total length is produced.

3. The method of claim 2 further comprising the step of designing a SONET transport ring for each hub-and-spoke, access, and backbone ring topology in accordance with a bin-packing heuristic.

4. The method of claim 3 wherein said bin-packing heuristic is a first-fit decreasing heuristic, said bin-packing heuristic attempts to assign demand to the rings in such a way that the demand is more evenly distributed among the rings.

5. The method of claim 1 wherein step (b) comprises the step of selecting a pair of adjacent nodes for each group to serve as ring hubs such that said hierarchical architecture is a path-in-line architecture.

6. The method of claim 3 wherein said access ring topology supports lower speed SONET rings than said backbone ring topology.

7. The method of claim 1 wherein the plurality of demand nodes are divided in step (a) in accordance with a p-median heuristic.

8. The method of claim 1 wherein said distinct groups of demand nodes each include less than a prescribed maximum number of nodes.

9. The method of claim 5 wherein said selected adjacent demand nodes are separated by a prescribed minimum distance.

10. The method of claim 1 wherein after the minimum cost network topology has been produced performing the step of redesigning said access ring topology and said backbone ring topology to incorporate therein pre-existing links.

11. The method of claim 10 wherein the redesigning step is performed in accordance with a Steiner Traveling Salesman Problem heuristic.

* * * * *